Aug. 9, 1949.   P. J. GOOD   2,478,476
DIAPHRAGM TYPE VARIABLE CONDITION
INDICATOR OR GAUGE

Filed Nov. 28, 1945   3 Sheets-Sheet 1

INVENTOR
PAUL J. GOOD
BY
his ATTORNEY

Aug. 9, 1949.                    P. J. GOOD                       2,478,476
                    DIAPHRAGM TYPE VARIABLE CONDITION
                              INDICATOR OR GAUGE
Filed Nov. 28, 1945                                          3 Sheets-Sheet 2

INVENTOR
PAUL J. GOOD.
BY
his ATTORNEY

Aug. 9, 1949.  P. J. GOOD  2,478,476
DIAPHRAGM TYPE VARIABLE CONDITION
INDICATOR OR GAUGE
Filed Nov. 28, 1945  3 Sheets-Sheet 3
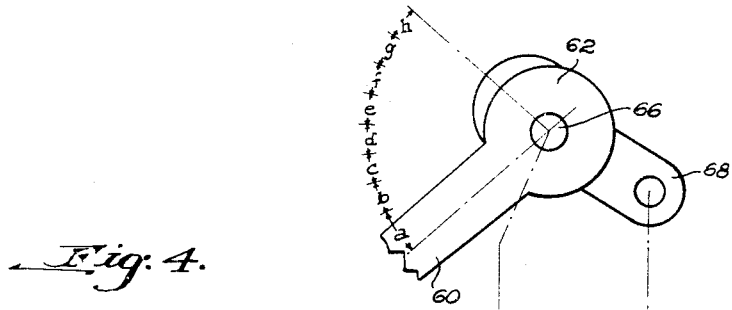
Fig. 4.
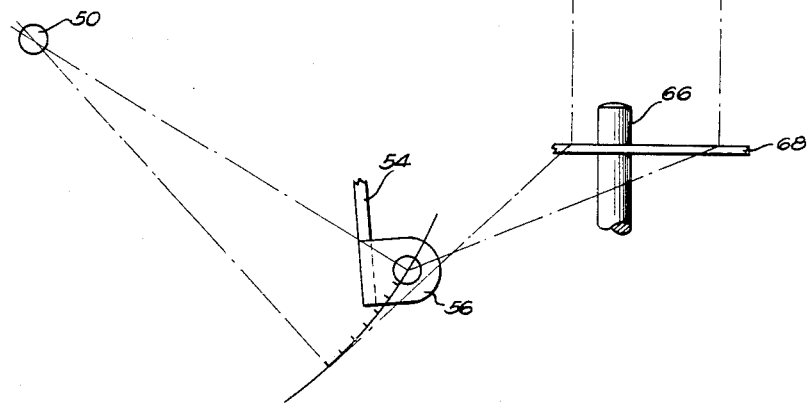
Fig. 5.
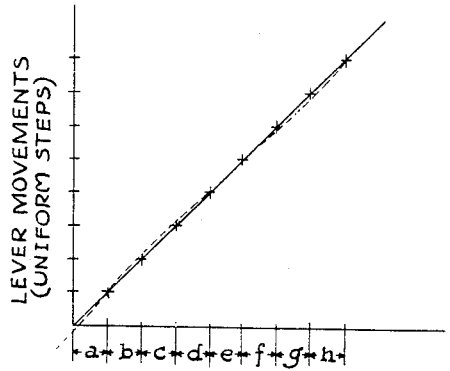
INVENTOR.
PAUL J. GOOD.
BY Albert J. Henderson
his ATTORNEY.

Patented Aug. 9, 1949

2,478,476

UNITED STATES PATENT OFFICE 2,478,476

DIAPHRAGM TYPE VARIABLE CONDITION INDICATOR OR GAUGE

Paul J. Good, St. Louis, Mo., assignor to Robertshaw-Fulton Controls Company, a corporation of Delaware Application November 28, 1945, Serial No. 631,277

1 Claim. (Cl. 73—410)

This invention relates to devices for indicating variation in a variable condition and, more particularly, to the fluid pressure operated type.

One object of the invention is to use a uniformly divided scale for the measurement of changes in the variable condition.

Another object of the invention is to render the device accurate within an extremely small margin throughout the range of indicated condition changes.

Another object of the invention is to permit installation of the dial scale at a point remote from the actuating element.

Another object of the invention is to utilize simple construction of parts which facilitate assembly operations and will withstand normal usage without necessitating frequent adjustment or repair.

Other objects and advantages will become apparent from the following description taken in connection with the accompanying drawings, wherein:

Fig. 4 is a diagrammatic view illustrating the motion of certain movable parts of the device; and Fig. 5 is a graphical representation of these movements.

Figure 1:
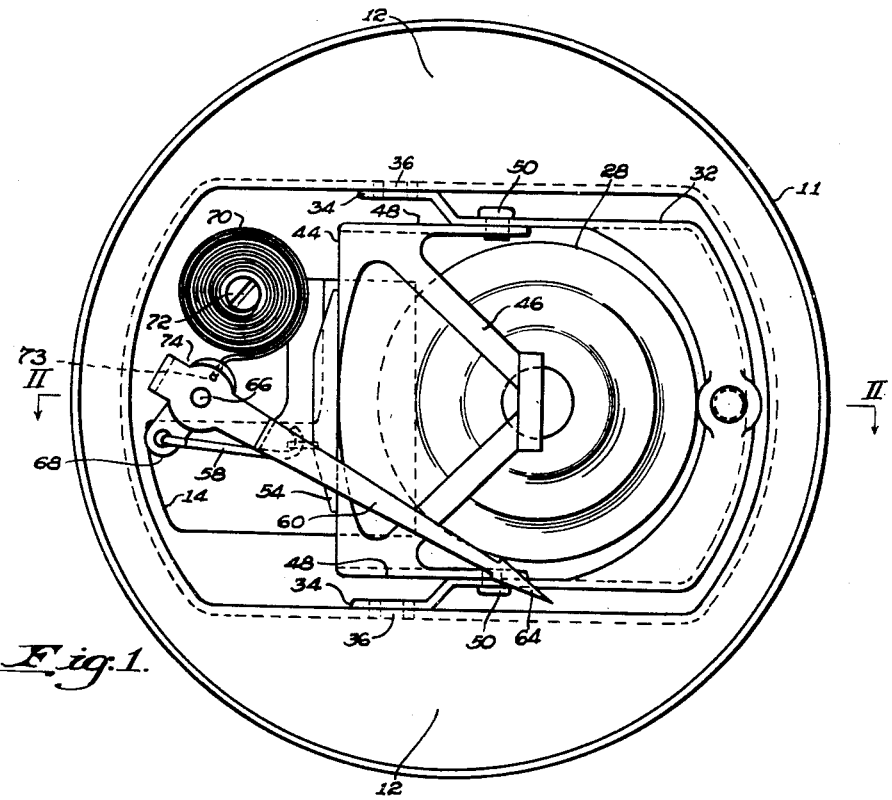
Fig. 1 is a plan view of a condition indicating device embodying the invention, with the portions of the device removed to show internal structure.
Figure 2:
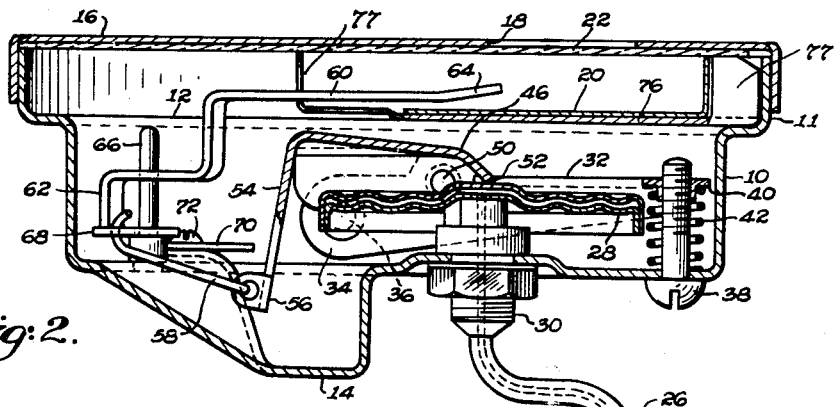
Fig. 2 is a cross section taken on the line II—II of Fig. 1 with the cover in place.
Figure 3:
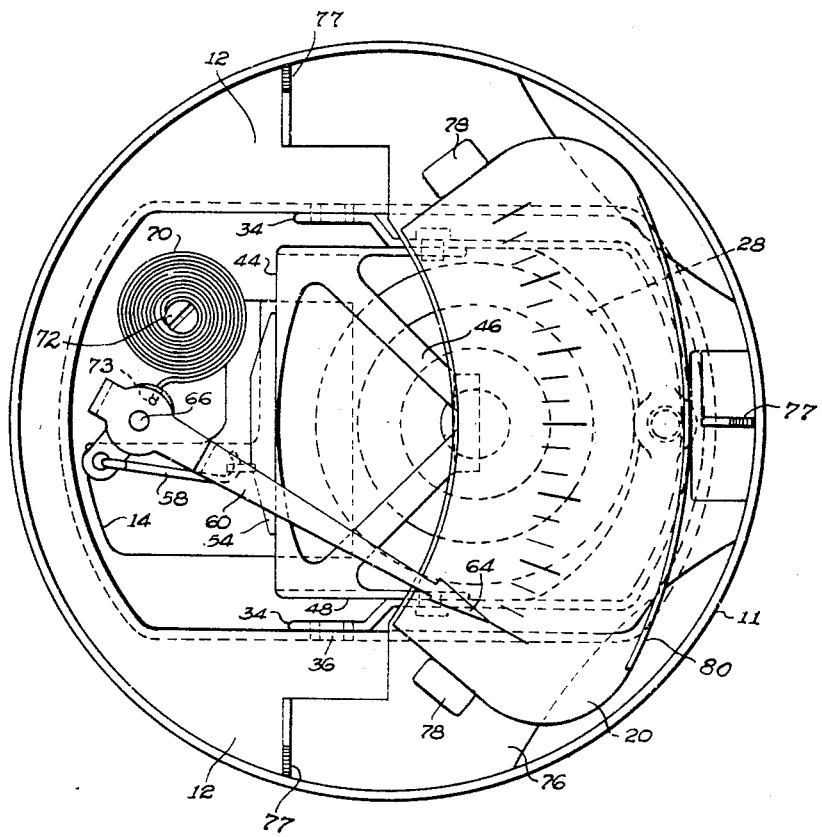
Fig. 3 is a plan view similar to Fig. 1 but with removed portions in position.

Referring more particularly to Figs. 1, 2 and 3 of the drawings, the device comprises a cup-shaped casing 10 having an upstanding rim 11 which defines oppositely disposed platform portions 12 within the casing 10. An L-shaped well or recessed portion 14 projects from the bottom wall of the casing 10 and is positioned on one side of the axis of the casing 10 intermediate the platform portions 12. The upstanding rim 11 accommodates a removable cover 16 having an arcuate slot or window 18 therein through which the scale plate 20 having evenly divided graduations may be viewed through a protective glass 22 positioned immediately beneath the cover 16.

The bottom wall of the casing 10 is perforated adjacent the recessed portion 14 for the reception of means movable in response to variations in a variable condition. In this embodiment this means takes the form of a bulb 24, capillary tube 26 and an expansible and contractible diaphragm element 28 which are secured together in the order named and completely filled with an expansible fluid for forming a thermally responsive assembly. The bulb 24 and capillary tube 26 are positioned exteriorly of the casing 10 while the diaphragm 28 is positioned rigidly in the interior thereof by means of a stud 30 which connects the diaphragm and tube and projects through the perforation in the bottom wall of the casing 10. It will be understood that the capillary tube 26 can be of any suitable length permitting the casing 10 to be positioned at a point remote from the bulb 24. The variation in temperature as sensed by the bulb 24 will result in expansive and contractive movement of the diaphragm 28. It will be apparent that other conditions such as pressure could be relied upon to cause the desired movement of the diaphragm 28.

A U-shaped bridge member 32 is positioned in the casing 10 with the opposite legs thereof straddling the diaphragm 28. The legs are provided with oppositely disposed lugs 34 offset in angular relation to the legs. The lugs 34 engage the adjacent side walls of the casing 10 depending from the platform portion 12 and are secured thereto for pivotal movement of the bridge member 32 by cylindrical bearing portions 36 which may be hollow and struck up from the side walls of the casing 10. The bridge member 32 is conveniently adjusted to the desired location in the casing 10 by means of an adjusting screw 38 which threadedly engages the bridge member 32 at a point intermediate the legs thereof and projects exteriorly of the casing 10. An integral nut portion 40 is formed on the bridge member 32 for the reception of the adjusting screw 38 and also to serve as a support for one end of a coil spring 42 having its opposite end engaging the bottom wall of the casing 10 for biasing the bridge member 32 in a counter-clockwise direction as viewed in Fig. 2.

A lever member 44 having a triangular projecting tongue 46 disposed centrally thereof is positioned between the oppositely disposed lugs 34 of the bridge member 32 but spaced therefrom due to the angular relation of these lugs to the legs of the bridge member 32. The lever member 44 is provided with depending portions 48 disposed on each side of the tongue 46 and which engage the adjacent legs of the bridge member 32 and are pivotally mounted thereon by means of pins 50. When the parts are adjusted in the housing 10, the tongue 46 of the lever 44 overlies a section of the diaphragm 28 and contact is made with an axial portion of the diaphragm 28 by means of a knife-edged projection 52 provided on the tongue 46 for this purpose.

The tongue 46 of the lever member 44 also has a depending end portion 54 opposite the knife-edge 52 which projects into one leg of the L-shaped recessed portion 14 of the casing 10 and is movable in an arcuate path therein due to the pivotal mounting 50 of the lever member 44. The depending end 54 of the lever member 44 carries an apertured lug 56 which projects into the other leg of the L-shaped recessed portion 14 and has one end of a link 58 hooked therein. An indicator 60 having a reversely bent bearing portion 62 at one end and a pointer 64 at the opposite end is supported in the casing 10 adjacent the recessed portion 14. The support for the indicator 60 takes the form of a post 66 projecting from the bottom wall of the casing 10 intermediate the legs of the L-shaped recessed portion 14 and extending through apertures in the reversely bent portion 62 to provide spaced bearing points. The pointer 64 overlies the lever member 44 and is visible through the window 18. The opposite end of the link 58 is hooked in an apertured lug 68 projecting from the reversely bent portion 62 of the indicator 60, it being noted that both ends of the link 58 are loosely mounted at their respective points of attachment to the indicator 60 and the lever 44, respectively. It will be apparent that the arcuate movement of the depending portion 54 of the lever 44 will be transmitted by the link 58 to the indicator 60 and will cause the pointer 64 to travel across the casing 10 in an arcuate path substantially normal to but spaced from the path of rotation of the lever 44.

The expansible movement of the diaphragm 28 will cause the pointer 64 to move, as viewed in Figs. 1 and 3, in a counterclockwise direction due to the mechanism described and means are provided to bias the pointer in an opposite or clockwise direction. This means takes the form of a torsion spring 70 having one end secured by a screw 72 to the base of the casing 10 adjacent the post 66 and the opposite end hooked around a pin 73 projecting from a lug 74 carried by the bent portion 62 of the indicator 60 opposite the lug 68 thereon.

The casing 10 is provided with a scale support plate 76, shown in Figs. 2 and 3, which serves to support the scale 20 in position underneath the pointer 64. The scale support plate 76 is generally triangular and covers approximately one-half of the casing 10 with the base extending across the tongue portion 46 of the lever 44. Preferably, the support plate 76 is press fitted within the rim 11 of the casing 10 and is seated at the corners upon the platform portion 12, each corner being provided with an upstanding lug 77 which engage the rim 11 for added rigidity. The lugs 77 are bent slightly from the plane of the support plate 76 to be spaced from the platforms 12 and provide somewhat resilient mounting for the glass 22. The scale 20 is provided with oppositely disposed lugs 78 which extend into suitable slots formed in the support plate 76 and cooperate therewith to fasten the scale plate 20 in position. One edge 80 of the scale plate 20 is upturned to engage the adjacent lug 77 on the support plate 76.

In the operation of the device it will be apparent that expansion of the diaphragm 28 will rotate the lever 44 on the pivot pin 50 causing the depending portion 54 to move in a counter-clockwise direction as viewed in Fig. 2. This movement causes the link 58 to move the indicator 60 also in a counter-clockwise direction as viewed in Fig. 3 so that the pointer 64 is moved across the scale 20. This movement will continue as long as the temperature at the bulb 24 increases and visual indication of the temperature rise is afforded. As the diaphragm movement is considerably amplified by the lever 44 a clear reading of the evenly divided graduations on the scale 20 is obtained. When the expansion of the diaphragm ceases and a contractive movement thereof occurs, the coil spring 70 will retract the pointer 64 as the lever 44 follows the diaphragm movement. Furthermore, residual lost motion in the parts is taken up by the spring 70 in addition to its function of retracting the pointer.

By referring to Figs. 4 and 5, it will be apparent that by the proper selection of length and relationship of the various components of the movement, an indicator deflection may be obtained which is very nearly proportional to the diaphragm movement over a range of approximately 80 degrees indicator deflection. The graphical representation of Fig. 5 will be clear without description and is constructed using equally spaced divisions to represent lever movement and the resultant indicator movement plotted thereon. Comparison of the resultant curve (shown in broken lines) with a straight line (shown as a full line) produces only small deviations. Hence, the device may be used with a uniformly divided scale with little error. While in this analysis side motion of the link 58 has not been considered the result is substantially correct as the effect of such motion obviously is small.

It will be apparent that the adjustable bridge member 32 permits accurate setting at any one deflection of the indicator and with normal manufacturing tolerances deflection to either side of this setting point will be accurate to within a small percentage. The utilization of fixed pivot points for the lever 44 provides accuracy with extreme simplicity of construction. It will be understood that many changes can be made in the arrangement and combination of parts and in the type of construction herein disclosed within the scope of the appended claim without departing from the spirit of the invention.

I claim:

A condition indicating device comprising a casing, a U-shaped bridge member pivotally mounted in said casing, means carried by said casing and engageable with said bridge member for adjusting the latter on its mounting, expansible means supported in said casing between the legs of said bridge member and being responsive to variations in a variable condition, a lever member having a tongue engageable with said expansible means, said lever and bridge members having bearing arrangement one with the other about which said lever member is adapted to be rotated by said expansible means, said lever member having a depending portion opposite said tongue, an indicator adapted to overlie said bridge member, a post projecting from said casing adjacent said depending portion and upon which said indicator is mounted for rotation in a path substantially normal to but spaced from the path of rotation of said lever member, a link connected at opposite ends thereof to said depending portion and indicator respectively for causing rotation of said indicator by said expansible means, and means operable between said casing and indicator for retracting the latter upon contraction of said expansible means.

PAUL J. GOOD.

REFERENCES CITED

The following references are of record in the file of this patent:

UNITED STATES PATENTS

| Number | Name | Date |
| --- | --- | --- |
| 1,924,781 | Gaiser | Aug. 29, 1933 |
| 2,253,769 | Dube | Aug. 26, 1941 |

FOREIGN PATENTS

| Number | Country | Date |
| --- | --- | --- |
| 18,300 | Great Britain | Nov. 13, 1890 |
| 274,234 | Great Britain | July 21, 1927 |